United States Patent [19]

Leitz et al.

[11] Patent Number: 4,900,797

[45] Date of Patent: Feb. 13, 1990

[54] THERMOPLASTIC POLYCARBONATE MIXTURES CONTAINING ALIPHATIC

[75] Inventors: Edgar Leitz; Herbert Eichenauer, both of Dormagen; Karl-Heinz Ott, Leverkusen, all of Fed. Rep. of Germany

[73] Assignee: Bayer Aktiengesellschaft, Leverkusen-Bayerwerk, Fed. Rep. of Germany

[21] Appl. No.: 318,977

[22] Filed: Mar. 6, 1989

[30] Foreign Application Priority Data

Mar. 17, 1988 [DE] Fed. Rep. of Germany ....... 3808836

[51] Int. Cl.$^4$ .............................................. C08L 69/00
[52] U.S. Cl. .................................... 525/413; 524/537; 525/462

[58] Field of Search ................ 525/413, 462; 528/370, 528/372; 524/537

[56] References Cited

U.S. PATENT DOCUMENTS 4,678,845  7/1987  Takamatsu et al. ................ 525/462

Primary Examiner—Theodore E. Pertilla
Attorney, Agent, or Firm—Connolly and Hutz

[57] ABSTRACT

The invention relates to thermoplastic polycarbonate mixtures containing aromatic polycarbonates and aliphatic polycarbonates and, optionally, stabilizers, pigments, mold release agents, flameproofing agents and/or antistatic agents. The invention also relates to a process for the production of the polycarbonate mixtures.

8 Claims, No Drawings

THERMOPLASTIC POLYCARBONATE MIXTURES CONTAINING ALIPHATIC

This invention relates to thermoplastic polycarbonate mixtures containing
1. thermoplastic aromatic polycarbonates and
2. aliphatic polycarbonates having weight average molecular weights Mw (as measured by ultracentrifugation or light scattering) in the range from 15,000 to 500,000 and preferably in the range from 20,000 to 400,000.

The quantity of aliphatic polycarbonate is between 2% by weight and 70% by weight, preferably between 3% by weight and 45% by weight and more preferably between 3% by weight and 25% by weight, based on the total weight of aliphatic polycarbonate and thermoplastic aromatic polycarbonate.

Accordingly, the quantity of aromatic polycarbonate is between 98% by weight and 30% by weight, preferably between 97% by weight and 55% by weight and more preferably between 97% by weight and 75% by weight, again based on the total weight of aliphatic and aromatic polycarbonate.

Aromatic polycarbonates based on bisphenol A and phosgene show excellent mechanical and thermal properties. Their toughness, heat resistance and high transparency make them versatile materials.

It has now surprisingly been found that mixtures of aromatic polycarbonates and aliphatic polycarbonates surpass aromatic homopolycarbonates in regard to toughness. At the same time, the polymer mixtures are distinguished by their ready processibility from the melt.

Aliphatic polycarbonates suitable for use as component (2) in accordance with the invention are preferably those corresponding to the formula (I)

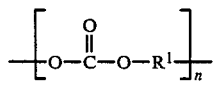

in which n is an integer of greater than 40, preferably from 40 to 4000 and more preferably from 50 to 3000 and $R^1$ is a linear $C_3$-$C_{12}$ alkylene radical or a radical corresponding to formulae (a) to (m) below:
(a) —CH$_2$CH$_2$CH(CH$_3$)—
(b) —CH$_2$CH$_2$OCH$_2$CH$_2$OCH$_2$CH$_2$—,
(c) —CH$_2$CH(CH$_3$)CH$_2$CH$_2$C(CH$_3$)$_2$CH$_2$—,

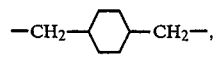 (d)

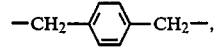 (e)

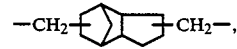 (f)

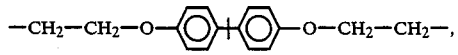 (g)

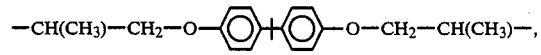 (h)

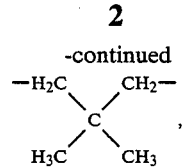 (i)

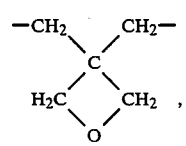 (j)

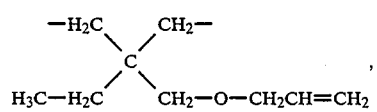 (k)

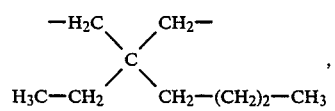 (l)

(m) —CH$_2$—CH$_2$—O—CH$_2$—CH$_2$—.

The aliphatic polycarbonates for component (2) may be prepared by standard methods, for example by reaction or phosgenation of diols (DE-OS 20 01 091, FR-PS 13 91 512, DE-OS 10 31 512, DE-OS 24 46 107, DE-OS 26 05 024, EP 002 641, DE-OS 24 47 349) and, better still, by ring-opening bulk and solution polymerization of cyclic aliphatic carbonates (cf. DE-OSS 15 45 116, 15 45 117, 31 03 135 and 32 04 078).

The preferred method of production is the anionic ring-opening solution polymerization of cyclic aliphatic carbonates at low temperatures in accordance with EP-A-O 236 862 (Le A 24 435-EP).

Cyclic aliphatic carbonates for the production of the aliphatic polycarbonates of component (2) to be used in accordance with the invention are compounds corresponding to formula (II):

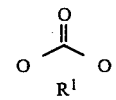

in which
$R^1$ is as defined for formula (I) except for "m", and compounds corresponding to formula (III)

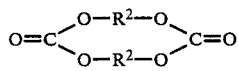 (III)

in which
$R^2$ is a linear $C_4$-$C_{12}$ alkylene radical or a radical corresponding to the following formulae
(m) —CH$_2$CH$_2$OCH$_2$CH$_2$— or
(b) —CH$_2$CH$_2$OCH$_2$CH$_2$OCH$_2$CH$_2$—.

Carbonates of formula (II) are preferably used for the production of the aliphatic polycarbonates to be used in accordance with the invention. The carbonate in which $R^1$=

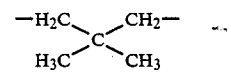

is particularly preferred.

The thermoplastic aromatic polycarbonates of component (1) to be modified in accordance with the invention are those based on diphenols corresponding to formula (IV)

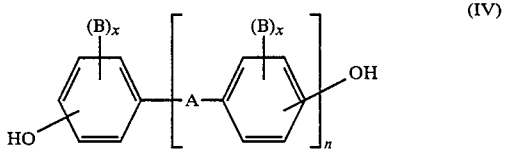

in which

"A" is a single bond, a $C_1$–$C_5$ alkylene radical, a $C_2$–$C_5$ alkylidene radical, a $C_5$–$C_6$ cycloalkylidene radical, —O—, —SO—,

—S—,

or a radical corresponding to formula (IVa)

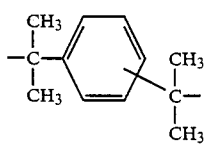

"B" is chlorine, bromine or methyl,
"X"=0, 1 or 2 and "n"=1 or 0,
and, optionally, to formula (V)

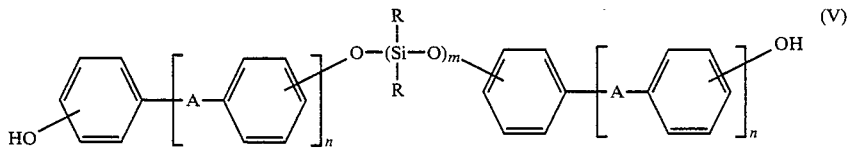

in which

A and "n" are as defined for formula (IV), the substituents

R may be the same or different and represent linear $C_1$–$C_{20}$ alkyl, branched $C_3$–$C_{20}$ alkyl, $C_6$–$C_{20}$ aryl, preferably $CH_3$, and m is an integer of from 5 to 100 and preferably from 20 to 80.

The diphenols corresponding to formula (IV) are known or may be produced by known methods; hydroxyaryloxy-terminated polydiorganosiloxanes corresponding to formula (V) are also known (cf. US-PS 3,419,634) or may be produced by known methods.

Suitable diphenols corresponding to formula (IV) are hydroquinone, resorcinol, dihydroxydiphenyls, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfides, bis-(hydroxyphenyl)-sulfones and α,α'-bis-(hydroxyphenyl)-diisopropylbenzenes and nucleus-chlorinated, nucleus-brominated or nucleus-methylated derivatives thereof.

Preferred diphenols of formula (IV) are 2,2-bis-(4-hydroxyphenyl)-propane, 2,2-bis-(3,5-dimethyl-4-hydroxyphenyl)-propane, 2,4-bis-(4-hydroxyphenyl)-2-methylbutane, 1,1-bis-(4-hydroxyphenyl)-cyclohexane, 4,4-dihydroxyphenyl sulfide, 4,4-dihydroxyphenyl sulfone and di- and tetra-brominated or -chlorinated derivatives thereof, such as 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

Suitable diphenols corresponding to formula (V) are those in which R is methyl, ethyl, propyl, n-butyl, tert.butyl or phenyl, more especially those corresponding to formula (VI)

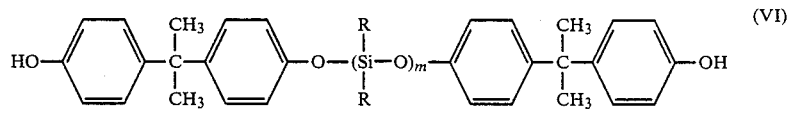

in which the substituents R are the same and have the meaning defined above and m is an integer of from 5 to 100 and preferably from 20 to 80.

The particularly preferred diphenol is 2,2-bis-(4-hydroxyphenyl)-propane.

The diphenols of formula (V) may be prepared, for exampale, from the corresponding bis-chlorine compounds corresponding to formula (VII)

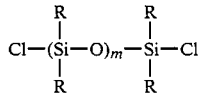

and corresponding diphenols (IV), for example in accordance with US-PS 3,419,635, column 3, in combination with US-PS 3,189,662.

In the bis-chlorine compounds (VII), R and m have the same meaning as in the diphenols (V) and (VI).

The aromatic polycarbonates of component (1) to be modified in accordance with the invention are homopolycarbonates of a diphenol and copolycarbonates of several diphenols, the diphenols of formula (V) only being used for the production of copolycarbonates with the diphenols of formula (IV) in a quantity by weight of 1 to 50% by weight, preferably 1.5 to 25% by weight and more preferably 2 to 10% by weight, based on the total weight of the diphenols of formulae (IV) and (V) used.

The aromatic polycarbonates of component (1) to be modified in accordance with the invention are also mixtures of a copolycarbonate of the diphenols corresponding to formulae (V) and (IV) and another siloxane-free thermoplastic polycarbonate, the content of diphenols of formula (V) in the polycarbonate mixture, based on the total weight of diphenols, again being from 1 to 50% by weight.

In addition to bisphenol A homopolycarbonate, preferred polycarbonates are the copolycarbonates of bisphenol A with up to 15 mol-%, based on the mol total of diphenols, of 2,2-bis-(3,5-dibromo-4-hydroxyphenyl)-propane.

The aromatic polycarbonates of component (1) to be modified in accordance with the invention may be branched in known manner, preferably by the incorporation of 0.05 to 2.0 mol-%, based on the sum of diphenols used, of trifunctional or more than trifunctional compounds, for example those containing three or more than three phenolic groups.

The production of the aromatic polycarbonates of component (1) to be modified in accordance with the invention is known and may be carried out, for example, with phosgene by the interfacial process or with phosgene by the homogeneous phase process ("pyridine process"). Molecular weight may be regulated by a corresponding quantity of known chain terminators (for polycarbonates containing polydiorganosiloxanes, see DE-OS 33 34 872 (Le A 22 594)).

The aromatic polycarbonates of component (1) to be modified in accordance with the invention have weight average molecular weights ($M_w$, as measured by ultracentrifugation or scattered light measurement) in the range from 10,000 to 200,000 and preferably in the range from 20,000 to 80,000.

Suitable chain terminators for regulating the molecular weights of the polycarbonates of component (1) are, for example, phenol, p-chlorophenol, p-tert.-butylphenol, 2,4,6-tribromophenol, long-chain alkylphenols, such as 4-(1,3-tetramethylbutyl)-phenol (DE-OS 28 42 005), monoalkylphenols and dialkylphenols containing a total of 8 to 20 C atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol (DE-OS 35 06 472).

The quantity of chain terminator is known and comprises from 0.5 mol-% to 10 mol-%, based on the mol total of the particular diphenols used.

The polycarbonate mixtures according to the invention may contain other known additives for polycarbonates, such as stabilizers, pigments, mold release agents, flameproofing agents and/or antistatic agents, in the usual quantities.

The polycarbonate mixtures according to the invention containing components (1) and (2) and, optionally, stabilizers, pigments, mold release agents, flameproofing agents and/or antistatic agents may be prepared by mixing their constituents in known manner and melt-compounding or melt-extruding the resulting mixture at temperatures of 200° to 330° C. in standard mixing units, such as internal kneaders, single-screw or twin-screw extruders.

Accordingly, the present invention also relates to a process for the production of thermoplastic polycarbonate mixtures containing components (1), (2) and, optionally, stabilizers, pigments, mold release agents, flameproofing agents and/or antistatic agents, characterized in that components (1), (2) and, optionally, stabilizers, pigments, mold release agents, flameproofing agents and/or antistatic agents are mixed in known manner and the resulting mixture is melt-compounded or melt-extruded in standard mixing units at temperatures of 200° C. to 330° C.

The constituents may be mixed both gradually and simultaneously in known manner at around 20° C. (room temperature) or even at higher temperatures.

The polycarbonate mixtures according to the invention may be used for the production of moldings of all kinds. In particular, moldings can be produced by injection molding. Examples of moldings which can be produced from the polycarbonate mixtures according to the invention are housing components of all kinds, for example for domestic appliances, or panels for the building industry.

EXAMPLES

Components

1.
Polycarbonate based on bisphenol A having a relative solution viscosity $n_{rel}$ of 1.26 to 1.28, as measured in $CH_2Cl_2$ at 25° C. and at a concentration of 0.5 g/100 ml.

2.1
Aliphatic polycarbonate based on neopentyl alcohol (2,2-dimethylpropane-1,3-diol) obtained by ring-opening anionic polymerization of neopentyl glycol carbonate; relative solution viscosity $\eta_{rel} = 1.95$ (2% by weight solution in $CH_2Cl_2$ at 20° C.); Mw=45,000 g/mol.

2.2
Aliphatic polycarbonate based on neopentyl alcohol (2,2-dimethylpropane-1,3-diol) obtained by ring-opening anionic polymerization of neopentyl glycol carbonate; relative solution viscosity $\eta_{rel} = 2.37$ (2% by weight solution in $CH_2Cl_2$ at 20° C.); Mw=95,000 g/mol.

2.3
Aliphatic polycarbonate based on neopentyl alcohol (2,2-dimethylpropane-1,3-diol) obtained by ring-opening anionic polymerization of neopentyl glycol carbonate; relative solution viscosity $\eta_{rel} = 4.08$ (2% by weight solution in $CH_2Cl_2$ at 20° C.); Mw=180,000 g/mol.

2.4
Aliphatic polycarbonate based on neopentyl alcohol (2,2-dimethylpropane-1,3-diol) obtained by ring-opening anionic polymerization of neopentyl glycol carbonate; relative solution viscosity $\eta_{rel} = 5.60$ (2% by weight solution in $CH_2Cl_2$ at 20° C.); Mw=250,000 g/mol.

3
Phosphorus acid ester of bis-(2-hydroxy-3-cyclohexyl)-5-methylphenyl)-methane as stabilizer.

The molecular weights (Mw) of components 2.1 to 2.4 were determined by gel permeation chromatography on the basis of a calibration curve for polyneopentyl glycol carbonate.

The components were compounded in a 1.3 liter internal kneader.

The test specimens were produced in an injection-molding machine at 260° C.

Notched impact strength was measured on bars measuring 50×6×4 mm (standard small bar) at room temperature in accordance with DIN 53 453 (melt temperature: 260° C.).

The Vicat (method B) softening point was determined in accordance with DIN 53 460.

The flowability of the materials was assessed from the filling pressure required in the injection molding machine used (melt temperature 260° C.) to produce the test specimens (see Johannaber, Kunststoffe 74 (1984), 1; pages 1 to 5).

The composition of the tested materials and the data obtained are shown in the following Tables.

TABLE

| Components | Composition: Examples according to the invention (parts by weight) | | | Comparison Example (parts by weight) | |
|---|---|---|---|---|---|
| | 1 | 2 | 3 | 4 | 5 |
| 1 | 90 | 90 | 90 | 90 | 100 |
| 2.1 | 10 | — | — | — | — |
| 2.2 | — | 10 | — | — | — |
| 2.3 | — | — | 10 | — | — |
| 2.4 | — | — | — | 10 | — |
| 3 | 0.25 | 0.25 | 0.25 | 0.25 | 0.25 |
| Tests: | 1 | 2 | 3 | 4 | 5 |
| Notched impact strength $a_k$ (RT) (KJ/m$^2$) (melt temperature 260° C.) | 47 | 46 | 54 | 52 | 22 |
| Softening point, Vicat B (120) (°C.) | 136 | 136 | 140 | 139 | 145 |
| Filling pressure at 260° C. (bar) | 71 | 82 | 97 | 105 | 156 |

We claim:

1. Thermoplastic polycarbonate mixtures containing
   1. thermoplastic aromatic polycarbonates and
   2. aliphatic polycarbonates having weight average molecular weights Mw (as measured by ultracentrifugation or light scattering) in the range from 15,000 to 500,000.

2. Polycarbonate mixtures as claimed in claim 1, characterized in that the Mw of the aliphatic polycarbonates is between 20,000 and 400,000.

3. Polycarbonate mixtures as claimed in claim 1, characterized in that component (1) is present in quantities of from 30% by weight to 98% by weight and component (2) in quantities of 70% by weight to 2% by weight, based on the total weight of components (1)+(2).

4. Polycarbonate mixtures as claimed in claim 3, characterized in that component (1) is present in quantities of 55% by weight to 97% by weight and component (2) in quantities of 45% by weight to 3% by weight.

5. Polycarbonate mixtures as claimed in claim 3, characterized in that component (1) is present in quantities of 75% by weight to 97% by weight and component (2) in quantities of 25% by weight to 3% by weight.

6. Polycarbonate mixtures as claimed in claim 1, characterized in that the aliphatic polycarbonates of component (2) correspond to formula (I)

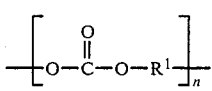

in which n is an integer of greater than 40 and R$^1$ is a linear C$_3$–C$_{12}$ alkylene radical or a radical corresponding to formulae (a) to (m) below (a) —CH$_2$CH$_2$CH(CH$_3$)—
(b) —CH$_2$CH$_2$OCH$_2$CH$_2$OCH$_2$CH$_2$—,
(c) —CH$_2$CH(CH$_3$)CH$_2$CH$_2$C(CH$_3$)$_2$CH$_2$—,

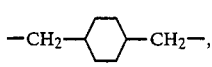

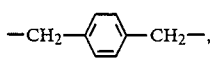

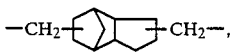

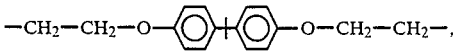

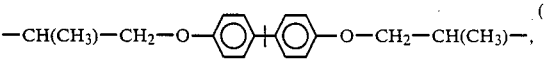

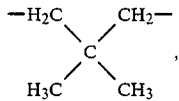

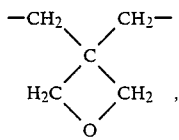

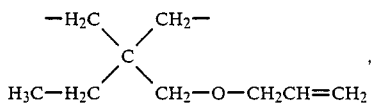

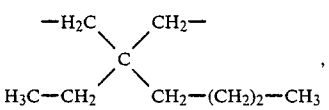

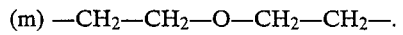

(m) —CH$_2$—CH$_2$—O—CH$_2$—CH$_2$—.

7. Polycarbonate mixtures as claimed in claim 1, characterized in that component (1) has an Mw (weight average molecular weight, as measured by ultracentrifugation or scattered light measurement) of from 10,000 to 200,000.

8. Polycarbonate mixtures as claimed in claim 1, characterized in that they additionally contain stabilizers, pigments, mold release agents, flameproofing agents and/or antistatic agents.

* * * * *

UNITED STATES PATENT AND TRADEMARK OFFICE
CERTIFICATE OF CORRECTION

PATENT NO. : 4,900,797
DATED : February 13, 1990
INVENTOR(S) : Edgar Leitz; Herbert Eichenauer; Karl-Heinz Ott It is certified that error appears in the above-identified patent and that said Letters Patent is hereby corrected as shown below:

The formula at column 2, line 45 should correctly be

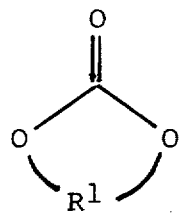

Signed and Sealed this

Fourteenth Day of July, 1992

Attest:

DOUGLAS B. COMER

Attesting Officer

Acting Commissioner of Patents and Trademarks